United States Patent Office 3,708,315
Patented Jan. 2, 1973

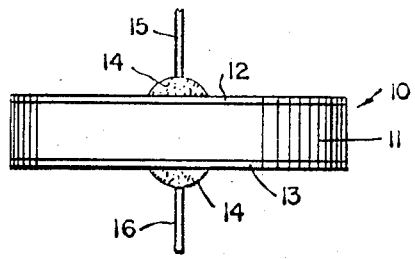

3,708,315
CERAMIC NIOBATE DIELECTRIC MATERIALS
Yoshihiro Matsuo, Hiromu Sasaki, and Shigeru Hayakawa, Osaka, Japan, assignors to Matsushita Electric Industrial Co., Ltd., Osaka, Japan
Filed June 12, 1970, Ser. No. 45,871
Claims priority, application Japan, Oct. 13, 1969,
44/81,982, 44/81,985
Int. Cl. C04b *33/00*
U.S. Cl. 106—39 R    3 Claims

ABSTRACT OF THE DISCLOSURE

A ceramic material in a perovskite structure having a high dielectric permittivity, a low power factor and a low temperature coefficient of permittivity, the composition of which is in a chemical formula of $$(Ba_xNa_{1-x})(Na_{0.25x}Nb_{1-0.25x})O_3$$

wherein $x$ ranges from 0.20 to 0.95 in accordance with the inventions. The ceramic dielectric composition of $$(Ba_xNa_{1-x})(Na_{0.25x}Nb_{1-0.25x})O_3$$

can be modified by substitution of Sr for Ba or Li for Na in accordance with the inventions.

---

This invention relates to ceramic dielectric materials and more specially to ceramic dielectric materials in a perovskite structure, which have a high dielectric permittivity, a low power factor and a low temperature coefficient of permittivity.

Since the recent electronic industry has required miniaturization and refinement of electrical equipment, there is an increasing need for a dielectric material of a high permittivity, a low power factor and a low temperature coefficient of permittivity. High permittivity facilitates producing a capacitor in a small physical size for a given capacitance and low power factor prevents a capacitor from being heated. Heat generation is a serious problem in miniaturized electrical equipment. Low temperature coefficient of permittivity of a capacitor enables electrical equipment or device to work in a high accuracy. It is also desired that the tempreature coefficient of permittivity can be chosen at a specific value.

Therefore, it is an object of the present invention to provide ceramic dielectric materials characterized by high permittivity and low power factor.

Another object of the present invention is to provide ceramic dielectric materials characterized by high permittivity, low power factor and a linear temperature coefficient of permittivity.

These and other objects will be apparent upon consideration of following detailed description taken together with accompanying drawing wherein:

The figure illustrates a cross sectional view of capacitor contemplated by the present invention.

Before proceeding with a detailed description of the nature of a capacitor embodying the invention, the construction of such a capacitor will be described with reference to the drawing. In this drawing, character 10 indicates generally a capacitor comprising a sintered disc 11 of dielectric material according to the invention. The sintered disc 11 is provided on two opposite surfaces with electrodes 12 and 13. The electrodes 12 and 13 may be applied to the surfaces by any suitable and available method, for example, by firing-on silver electrode paint commercially available. The disc 11 is a plate which may have any of suitable shapes, for example, circular, square or rectangular. Wire leads 15 and 16 are attached conductively to the electrodes 12 and 13, respectively by a connection means 14 such as solder or the like.

The sintered disc comprise a perovskite-type compound represented by chemical Formula 1;

$$(Ba_xNa_{1-x})(Na_{0.25x}Nb_{1-0.25x})O_3 \quad (1)$$

wherein $x$ ranges from 0.2 to 0.95 in accordance with the inventions.

A sintered disc having a composition of chemical Formula 1 is in a perovskite structure and has a permittivity of 90 to 400, a power factor lower than $10 \times 10^{-4}$ and a temperature coefficient of permittivity of $-50$ to $+800$ p.p.m./° C. If the $x$ in chemical Formula 1 is out of the range of 0.2 to 0.95, the resultant disc does not show a power factor less than $10 \times 10^{-4}$, as shown in Table 1.

The ceramic dielectric composition of chemical Formula 1 can be modified by substitution of Sr for Ba in accordance with the invention: The Sr-modified composition is represented by chemical Formula 2;

$$(Sr_xNa_{1-x})(Na_{0.25x}Nb_{1-0.25x})O_3 \quad (2)$$

wherein $x$ ranges from 0.2 to 0.95 in accordance with the invention. A sintered disc having a composition of chemical Formula 2 is in a perovskite structure and has a permittivity of 80 to 320, a power factor lower than $10 \times 10^{-4}$ and a temperature coefficient of permittivity of $-60$ to $+1000$ p.p.m./° C. If the $x$ in the chemical Formula 2 is outside of the range of 0.2 to 0.95, the resultant disc does not show a power factor less than $10 \times 10^{-4}$, as shown in Table 2.

The ceramic dielectric composition of chemical Formula 2 can be modified by substitution of Li for Na in accordance with the invention: The Li-modified composition is represented by chemical Formula 3;

$$(Sr_xLi_{1-x})(Li_{0.25x}Nb_{1-0.25x})O_3 \quad (3)$$

wherein $x$ ranges from 0.2 to 0.95 in accordance with the invention. A sintered disc having the composition of chemical Formula 3 is in a perovskite structure and has a permittivity of 60 to 300, a power factor lower than $10 \times 10^{-4}$ and a temperature coefficient of permittivity of $-50$ to $+300$ p.p.m./° C. If the $x$ in chemical Formula 3 is outside of the range of 0.2 to 0.95, the resultant disc does not show a power factor less than $10 \times 10^{-4}$, as shown in Table 3.

The composition in chemical Formula 1 to 3 can be prepared by mixtures of ingredient oxides in mole ratio dependent upon the chemical formulae. For example, the composition in chemical Formula 1 can be prepared by the following mixture listed in Table 4, wherein $x$ ranges from 0.20 to 0.95. It is possible to employ, as the starting material, any compound which is converted into an oxide during firing process. Operable starting materials which may be employed in place of an oxide are, for example, carbonates, hydro-oxides, and oxalates. A given mixture is well mixed in a wet ball mill, dried, calcined, pulverized, and pressed into discs. The pressed discs are fired at a given temperature dependent upon compositions of mixtures. The Ag-electrode is attached to the both surfaces of the fired disc. Permittivity and power factor of the discs are measured at a constant applied field of 1 mHz as a function of temperature from $-190°$ to $300°$ C. The temperature coefficient of permittivity ($\alpha$) is usually defined by the following equation:

$$\alpha = \epsilon(80° \text{ C.}) - \epsilon(20° \text{ C.})/\epsilon(20° \text{ C.}) \times (80° \text{ C.} - 20° \text{ C.})$$

wherein
$\epsilon(80°$ C.) is a permittivity of $80°$ C.
$\epsilon(20°$ C.) is a permittivity of $20°$ C.

EXAMPLE

Compositions corresponding to the chemical formulae listed in column 1 of Table 5 are prepared by using starting materials of barium carbonate, strontium carbonate, sodium carbonate, lithium carbonate, and niobium oxide.

The mixtures of starting materials in given compositions are intimately mixed in a wet ball mill, dried, calcined for two hours at a temperature as shown at the column 2 of the tables (first firing temperature), pulverized, and pressed at a pressure of 700 kg. per cm.$^{-2}$ into discs. The pressed discs are fired for two hours at a temperature as shown at the column 3 of the tables (final firing temperature). The permittivity and power factor at 20° C. and 1 mHz. set forth in column 4 and the column 5 of Table 5, respectively. The temperature coefficients of permittivity are set forth in column 6 of Table 5. All the samples shown in the tables are desirable for use in a capacitor.

The embodiments of the invention in which exclusive property or privilege is claimed are defined as follows:

1. A sintered ceramic dielectric material consisting essentially of a perovskite-type compound of the chemical formula $(Ba_xNa_{1-x})(Na_{0.25x}Nb_{1-0.25x})O_3$ wherein $x$ ranges from 0.2 to 0.95.

2. A sintered ceramic dielectric material consisting essentially of a perovskite type compound of the chemical formula $(Sr_xLi_{1-x})(Li_{0.25x}Nb_{1-0.25x})O_3$, wherein $x$ ranges from 0.2 to 0.95.

TABLE 1

| Sample number | Composition | First firing temperature (° C.) | Final firing temperature (° C.) | Permittivity at 20° C. and 1 mHz. | Power factor at 20° C. and 1 mHz. (×10$^{-4}$) | Temperature coefficient of permittivity (p.p.m./° C.) |
|---|---|---|---|---|---|---|
| 71 | $(Ba_{0.98}Na_{0.02})(Na_{0.245}Nb_{0.755})O_3$ | 1,100 | 1,400 | 85 | 12 | −50 |
| 79 | $(Ba_{0.1}Na_{0.9})(Na_{0.025}Nb_{0.975})O_3$ | 1,000 | 1,200 | 400 | 35 | +1,500 |

TABLE 2

| Sample number | Composition | First firing temperature (° C.) | Final firing temperature (° C.) | Permittivity at 20° C. and 1 mHz. | Power factor at 20° C. and 1 mHz. (×10$^{-4}$) | Temperature coefficient of permittivity (p.p.m./° C.) |
|---|---|---|---|---|---|---|
| 81 | $(Sr_{0.98}Na_{0.02})(Na_{0.245}Nb_{0.755})O_3$ | 1,100 | 1,420 | 75 | 12 | −60 |
| 89 | $(Sr_{0.1}Na_{0.9})(Na_{0.025}Nb_{0.975})O_3$ | 1,000 | 1,200 | 300 | 40 | +1,800 |

TABLE 3

| Sample number | Composition | First firing temperature (° C.) | Final firing temperature (° C.) | Permittivity at 20° C. and 1 mHz. | Power factor at 20° C. and 1 mHz. (×10$^{-4}$) | Temperature coefficient of permittivity (p.p.m./° C.) |
|---|---|---|---|---|---|---|
| 91 | $(Sr_{0.98}Li_{0.02})(Li_{0.245}Nb_{0.755})O_3$ | 1,100 | 1,400 | 50 | 14 | −60 |
| 99 | $(Sr_{0.1}Li_{0.9})(Li_{0.025}Nb_{0.975})O_3$ | 1,000 | 1,200 | 200 | 20 | +600 |

TABLE 4

| Ingredient: | Mole ratio |
|---|---|
| Barium oxide (BaO) | $x$ |
| Sodium oxide (Na$_2$O) | $0.5-0.375x$ |
| Niobium oxide (Nb$_2$O$_5$) | $0.5-0.125x$ |

3. A sintered ceramic dielectric material consisting essentially of a perovskite type compound of the chemical formula $(Sr_xLi_{1-x})(Li_{0.25x}Nb_{1-0.25x})O_3$, wherein $x$ ranges from 0.2 to 0.95.

TABLE 5

| | Col. 1 | Col. 2 | Col. 3 | Col. 4 | Col. 5 | Col. 6 |
|---|---|---|---|---|---|---|
| 72 | $(Ba_{0.95}Na_{0.05})(Na_{0.2375}Nb_{0.7625})O_3$ | 1,100 | 1,320 | 90 | 7 | −50 |
| 73 | $(Ba_{0.9}Na_{0.1})(Na_{0.225}Nb_{0.775})O_3$ | 1,050 | 1,270 | 100 | 4 | −50 |
| 74 | $(Ba_{0.8}Na_{0.2})(Na_{0.2}Nb_{0.8})O_3$ | 1,050 | 1,250 | 150 | 5 | −40 |
| 75 | $(Ba_{0.7}Na_{0.3})(Na_{0.175}Nb_{0.825})O_3$ | 1,050 | 1,250 | 200 | 6 | −20 |
| 76 | $(Ba_{0.5}Na_{0.5})(Na_{0.125}Nb_{0.875})O_3$ | 1,050 | 1,250 | 250 | 7 | +50 |
| 77 | $(Ba_{0.3}Na_{0.7})(Na_{0.075}Nb_{0.925})O_3$ | 1,050 | 1,240 | 350 | 8 | +400 |
| 78 | $(Ba_{0.2}Na_{0.8})(Na_{0.05}Nb_{0.95})O_3$ | 1,000 | 1,220 | 400 | 10 | +800 |
| 82 | $(Sr_{0.95}Na_{0.05})(Na_{0.2375}Nb_{0.7625})O_3$ | 1,100 | 1,350 | 80 | 8 | −60 |
| 83 | $(Sr_{0.9}Na_{0.1})(Na_{0.225}Nb_{0.775})O_3$ | 1,050 | 1,300 | 90 | 5 | −60 |
| 84 | $(Sr_{0.8}Na_{0.2})(Na_{0.2}Nb_{0.8})O_3$ | 1,050 | 1,270 | 130 | 5 | −50 |
| 85 | $(Sr_{0.7}Na_{0.3})(Na_{0.175}Nb_{0.825})O_3$ | 1,050 | 1,270 | 180 | 7 | −40 |
| 86 | $(Sr_{0.5}Na_{0.5})(Na_{0.125}Nb_{0.875})O_3$ | 1,050 | 1,270 | 230 | 8 | +60 |
| 87 | $(Sr_{0.3}Na_{0.7})(Na_{0.075}Nb_{0.925})O_3$ | 1,000 | 1,250 | 300 | 9 | +500 |
| 88 | $(Sr_{0.2}Na_{0.8})(Na_{0.05}Nb_{0.95})O_3$ | 1,000 | 1,230 | 320 | 10 | +1,000 |
| 92 | $(Sr_{0.95}Li_{0.05})(Li_{0.2375}Nb_{0.7625})O_3$ | 1,100 | 1,320 | 60 | 10 | −50 |
| 93 | $(Sr_{0.9}Li_{0.1})(Li_{0.225}Nb_{0.775})O_3$ | 1,050 | 1,270 | 80 | 8 | −40 |
| 94 | $(Sr_{0.8}Li_{0.2})(Li_{0.2}Nb_{0.8})O_3$ | 1,050 | 1,250 | 110 | 5 | −40 |
| 95 | $(Sr_{0.7}Li_{0.3})(Li_{0.175}Nb_{0.825})O_3$ | 1,050 | 1,250 | 150 | 4 | −20 |
| 96 | $(Sr_{0.5}Li_{0.5})(Li_{0.125}Nb_{0.875})O_3$ | 1,050 | 1,250 | 200 | 3 | +40 |
| 97 | $(Sr_{0.3}Li_{0.7})(Li_{0.075}Nb_{0.925})O_3$ | 1,050 | 1,240 | 280 | 5 | +150 |
| 98 | $(Sr_{0.2}Li_{0.8})(Li_{0.05}Nb_{0.95})O_3$ | 1,000 | 1,220 | 300 | 8 | +300 |

References Cited

UNITED STATES PATENTS

| 2,452,532 | 10/1948 | Wainer | 106—39 R |
| 3,502,598 | 3/1970 | Nitta et al. | 252—62.9 |
| 2,864,713 | 12/1958 | Lewis | 106—39 R |
| 3,231,799 | 1/1966 | Prokopowicz et al. | 106—39 R |

OTHER REFERENCES

Wemple, S. H. et al.: Relationship Between Linear and Quadratic Electro-Optic Coefficients in . . . Ferroelectrics . . . in Appl. Phys. Letters, March 1968, pp. 209–211.

Evans: Introduction to Crystal Chemistry; Cambridge, 1964, pp. 168–170.

TOBIAS E. LEVOW, Primary Examiner

W. R. SATTERFIELD, Assistant Examiner

U.S. Cl. X.R.

252—63.5, 521